United States Patent Office 3,344,902
Patented Oct. 3, 1967

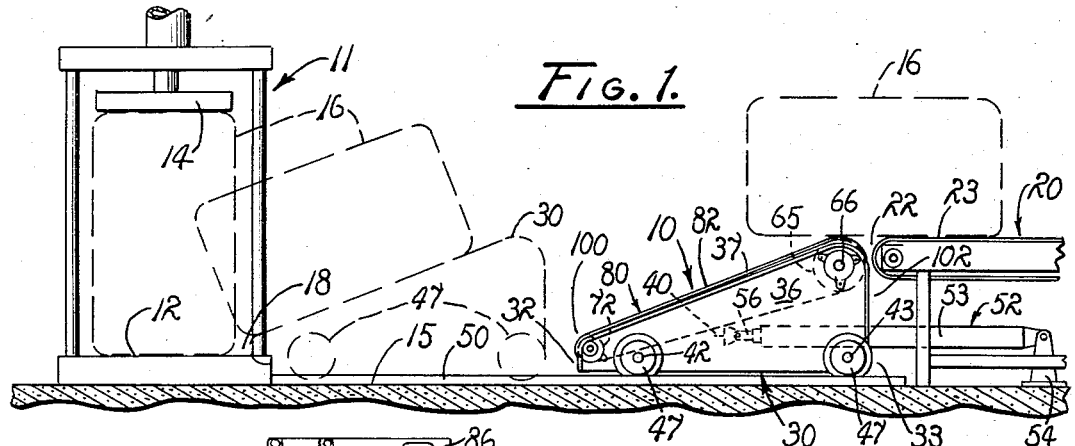
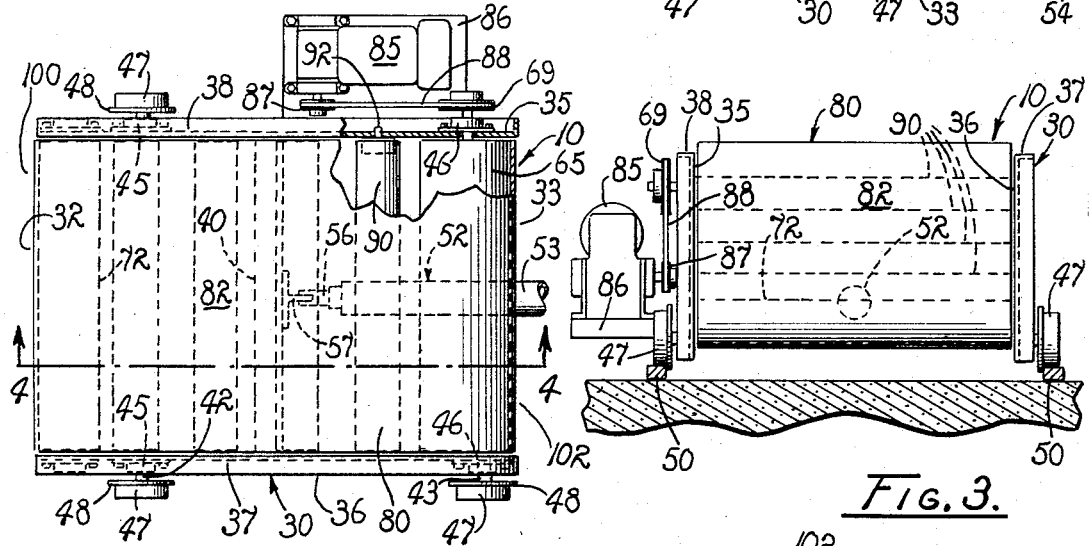
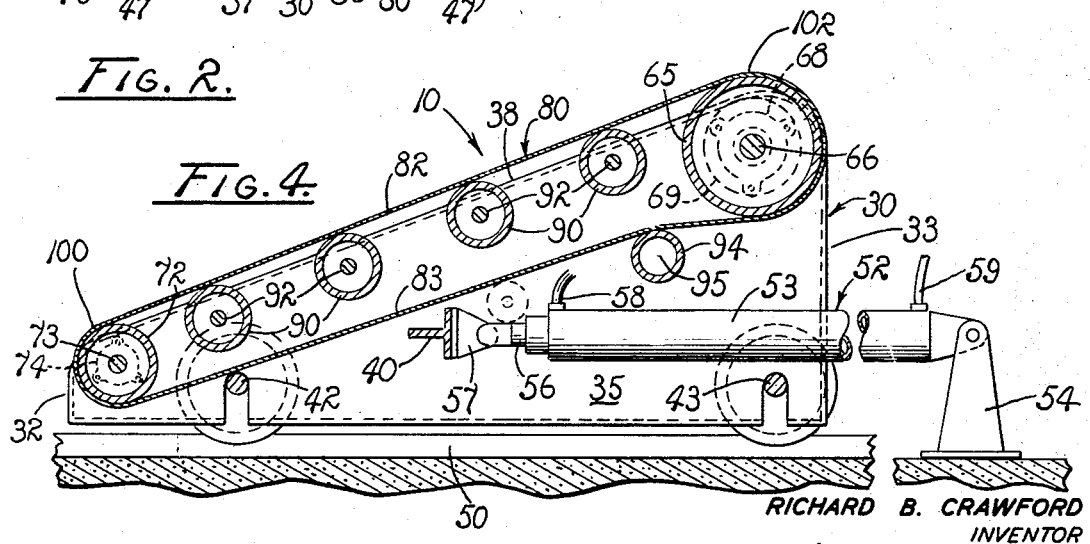

3,344,902
LOAD TRANSFER AND ELEVATING DEVICE
Richard B. Crawford, 6067 N. Forkner Ave.,
Fresno, Calif. 93705
Filed June 10, 1965, Ser. No. 462,990
6 Claims. (Cl. 198—96)

The present invention relates to a load transfer and elevating device and more particularly to such a device for receiving bales at a loading station and automatically discharging the bales at an elevated unloading station spaced a predetermined distance from the loading station. The structure of the present invention is specifically intended for use in a bale conveying system of the type described and disclosed in my copending application entitled Curved Conveyor filed concurrently herewith and my copending application Ser. No. 415,297, entitled Bale Handling Device, filed Dec. 2, 1964. Of course, the present invention is not limited to such illustrative environment.

The bale conveying systems of my above designated copending applications are utilized in cotton gins to transfer cotton bales between a low-powered press, known as a "dinky press," and a large capacity or high density press which prepares the bales for shipment from the gin. The ends of the conveyor must be spaced from their respective presses in order to provide an unrestricted area for workmen to perform the necessary banding operations while the bales are in the presses. However, the bales must be transported through the unrestricted banding area when being transferred from the dinky press to the conveyor and from the conveyor to the high density press. If these operations are accomplished by manual lifting, several workmen are required. Furthermore, since the bale constraining bands are removed in the dinky press and transported along the conveyor to the high density press in such unbanded condition, the bales are easily separable and are frequently inadvertently torn apart by even the most careful handling. Therefore, it was recognized that an automatic bale handling device would be desirable so that the bales could be transferred between the presses and the conveyor with a minimum of damage for the bales and with a minimum of manipulation by the workmen while maintaining the necessary unrestricted banding area adjacent to the presses. While the bale handling device of my copending application Ser. No. 415,297 and the structure of the present invention are adapted to be operable at either end of the conveyor, the former is primarily intended to operate between the discharge end of the conveyor and the high density press and the latter is primarily intended for use between the receiving end of the conveyor and the dinky press.

Accordingly, it is an object of the present invention to provide an improved load transfer and elevating device.

Another object is to provide such an improved load transfer and elevating device which is effective to transport bales between a pressing station and an elevated conveying station spaced from the pressing station with a minimum of damage to the bales.

Another object is to provide a load transfer and elevating device of the character described which maintains an unrestricted workman banding area adjacent to the pressing station.

Another object is to provide a load transfer and elevating device which is selectively reciprocable between the pressing and conveying stations.

Another object is to provide a load transfer and elevating device having an inclined bale transporting member capable of receiving bales from the pressing station and automatically discharging the bales at the conveying station.

Another object is to provide a load transfer and elevating device which is effective quickly and conveniently to transport bales between the pressing and conveying stations with a minimum of handling by the workmen.

Other objects and advantages of the present invention will subsequently become more clearly apparent upon reference to the following description and accompanying drawing.

In the drawing:

FIG. 1 is a view in side elevation of a load transfer and elevating device embodying the principles of the present invention disposed between a bale press and a bale conveyor with alternate bale receiving and discharging positions shown respectively in dashed and full lines.

FIG. 2 is a somewhat enlarged top plan view of the load transfer and elevating device of the present invention with portions broken away for illustrative convenience.

FIG. 3 is a somewhat enlarged front elevation of the load transfer and elevating device of the present invention.

FIG. 4 is a further enlarged longitudinal cross section through the load transfer and elevating device of the present invention taken on line 4—4 of FIG. 2.

Referring more particularly to the drawing, a load transfer and elevating device embodying the principles of the present invention is generally indicated by the reference numeral 10. The transfer and elevating device is adapted to be associated with a dinky press 11 which has a lower bale support surface 12 and an upwardly disposed powered bale compressing head 14. The press is mounted on a floor 15 or other suitable supporting surface with the lower bale support surface 12 disposed in closely spaced substantially parallel relation thereto. By way of illustration, a cotton bale 16 is adapted to be disposed within the dinky press where it is placed under sufficient compression to permit loosening and convenient removal of the constraining bands thereabout, not shown. The dinky press thereby provides a bale pressing or loading station 18. The transfer and elevating device 10 is shown associated with a bale conveyor 20 providing a bale unloading station 22 spaced from the loading station and providing an upper bale conveying surface 23 disposed in a plane elevationally spaced from the bale support surface 12 of the dinky press.

The transfer and elevating device 10 provides a movable carriage 30 having opposite forward and rearward ends 32 and 33, respectively. The carriage includes a pair of oppositely spaced substantially parallel side walls 35 and 36 having upper edges 37 and 38, respectively, inclined upwardly from the forward end 32 to the rearward end 33 of the carriage. The side walls are maintained in the desired relation by a T-shaped brace 40 rigidly connected at its ends to the side walls, as by welding or the like in a position intermediate the ends of the carriage. The side walls are further interconnected and maintained in the described spaced relation by a pair of forward and rearward axle shafts 42 and 43, respectively. The axle shafts are journaled and axially constrained with respect to the side walls by pairs of bearing caps 45 and 46, respectively. The axle shafts are outwardly extended from their respective bearing caps individually to mount a plurality of wheels 47 having inner annular flanges 48. The wheels rollably engage and mount the carriage on a pair of spaced substantially parallel tracks 50 mounted on the floor 15 between the dinky press 11 and the bale conveyor 20.

The carriage 30 is reciprocable between the dinky press 11 and the conveyor 20 during extension and retraction of an hydraulic jack 52. The jack provides an elongated cylinder end 53 which is mounted on a substantially upright bracket 54 supported on the floor 15 beneath the conveyor 20. The jack includes a piston rod end 56 which is connected by way of a bracket 57 to the T-shaped brace 40 on the carriage. Extension and retraction of the piston rod end 56 of the jack is controlled by hydraulic fluid under pressure alternately supplied to the jack by a pair of hydraulic hoses 58 and 59 which are connected to an hydraulic control and fluid supply system, not shown.

A cylindrical drum 65 of a predetermined diameter is mounted on an elongated shaft 66 having ends extended through the side walls 35 and 36 adjacent to the rearward end 33 and the upper edges 37 and 38 of the side walls of the carriage 30. The shaft is journaled for rotation and axially constrained with respect to the side walls by a pair of opposite bearing caps 68 individually secured to the side walls. The shaft is outwardly extended from the side wall 35 of the carriage to mount a pulley 69. A cylindrical drum 72 of a somewhat smaller diameter than the drum 65 is disposed at the forward end 32 of the carriage adjacent to the upper edges 37 and 38 of the side walls 35 and 36. The drum is mounted for rotation with an elongated shaft 73 extended through the side walls and through bearing caps 74 individually secured to the side walls.

An endless resiliently flexible belt 80 is trained for circuitous movement about the drums 65 and 72. The belt provides an inclined upper bale support and transporting run 82 which is adapted to be traveled upwardly in a direction from the small diameter drum 72 to the larger diameter drum 65 and a lower run 83. Such movement is effected by a drive motor 85 which is supported upon a platform 86 outwardly extended from the side wall 35 of the carriage 30. The motor mounts a drive pulley 87 in coplanar relation with the drum pulley 69 with the pulleys having an endless V-belt 88 trained thereabout for rotation of the drum 65 and the belt 80. The upper run 82 of the belt is supported on the upper peripheries of a plurality of support rollers 90. The support rollers are individually freely rotatable in equally spaced relation between the drums 65 and 72 on mounting shafts 92 journaled in the side walls 35 and 36 of the carriage. A belt tensioning roller 94 is similarly mounted on a shaft 95 between the side walls of the carriage and has an upper periphery rollably engageable with the lower surface of the lower run 83 of the belt 80. As best shown in FIG. 1, the inclined upper run 82 of the belt 80 provides a lower bale receiving end 100 adjacent to the drum 72 which is disposed at substantially the level of the lower support surface 12 of the dinky press 11. The belt also provides an opposite upper bale discharging end 102 which is disposed at substantially the level of the upper bale conveying surface 23 of the bale conveyor 20.

Operation

The operation of the described embodiment of the subject invention is believed to be clearly apparent and is briefly summarized at this point. The operation of the transfer and elevating device 10 of the present invention is initiated by energizing the motor 85 to provide continuous movement of the upper run 82 of the belt 80 in a direction from the forward end 32 to the rearward end 33 of the carriage 30. Assuming the carriage is disposed in the full line position of FIG. 1, the hydraulic jack 52 is actuated to admit hydraulic fluid under pressure to the cylinder end 53 thereof by way of the hydraulic hose 59 to extend the piston rod end 56. During such extension, the carriage is traveled in a direction toward the dinky press 11 by rolling engagement of the wheels 47 upon their respective tracks 50. When the hydraulic jack reaches the end of its stroke, the carriage is disposed in the dashed line position of FIG. 1 with the forward end 32 of the carriage and the receiving end 100 of the belt 80 positioned closely adjacent to the lower support surface 12 of the press.

Upon release of the bale 16 from the dinky press, the bale is manually tipped onto the upper run 82 of the belt which immediately carries the bale toward the upper discharging end 102 thereof. The hydraulic jack 52 is simultaneously actuated to drain the cylinder end 53 and to admit hydraulic fluid under pressure to the rod end thereof through the hose 58 to cause retraction of the piston rod end 56. Retraction of the jack returns the carriage 30 toward the bale conveyor 20 and when fully retracted, disposes the carriage in the full line position of FIG. 1.

During such movement, the belt 80 is continuously driven so that the upper run 82 carries the leading end of the bale 16 past the rearward end 33 of the carriage in a position extended above the bale conveying surface 23 of the conveyor 20. When the bale reaches an over-center position with respect to the rearward end of the carriage, the leading end of the bale gravitationally descends and is received upon the bale conveying surface of the conveyor. Continued frictional engagement of the upper run 82 of the belt above the drum 65 motivates the trailing end of the bale onto the conveyor for complete discharge of the bale from the discharging end 102 of the belt. The bale is then entirely supported on the conveyor and transported thereby to the high density press, not shown. The above described operation is then repeated for each subsequent bale discharged from the dinky press. It is noted that the bale is received, transported and discharged by the continuously driven belt 80 in one smooth continuous motion during movement of the carriage between the press and the bale conveyor. The bale is automatically transferred from the receiving end 100 to the discharging end 102 of the belt and completely discharged from the belt and carriage with no manual assistance.

In view of the foregoing, it is readily apparent that the structure of the present invention has provided an improved transfer and elevating device which is effective to transport bales from a pressing station and automatically to discharge bales at an elevated unloading or conveying station with a minimum of damage to the bales. The structure of the present invention maintains the desired unrestricted area for workmen adjacent to the press during the banding operations while providing quick and convenient transfer of the bales between the press and the conveyor with a minimum of handling by the workmen.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. Apparatus including a bale transfer and elevating device adapted to convey bales between a bale press and a conveyor spaced from the press with the press and conveyor providing varied elevational bale support surfaces, comprising a carrier member; first powered means connected to said carrier member for selective reciprocal movement of the carrier member along a predetermined path of travel between the press and the conveyor; a bale support member having an inclined bale transporting surface providing a bale receiving end disposed at substantially the level of said press and an opposite bale discharging end disposed at substantially the level of the conveyor; and second powered means mounted on the carrier member and connected in driving relation to said bale support member for traveling said bale transporting surface thereof in a direction from said receiving end to said discharging end of said bale support member so as to transfer said bales from the press to the conveyor incident to movement of the carrier member toward the conveyor.

2. Apparatus including a bale transfer and elevating device adapted to transfer bales between a bale press and a conveyor spaced from the press with the press and conveyor providing varied elevational bale support surfaces, comprising a carriage; first powered means connected to said carriage for selective reciprocal movement of the carriage along a predetermined path of travel between the press and the conveyor; an endless belt mounted on the carriage having an upper bale support run providing a bale receiving end disposed at substantially the level of said press and an opposite bale discharging end disposed at substantially the level of the conveyor; and second powered means mounted on the carriage having driving connection to the endless belt to motivate the upper run thereof in a direction from its receiving end to its discharging end so as to receive bales from the press and automatically to discharge them upon said conveyor incident to movement of the carriage toward the conveyor.

3. Apparatus including a bale transfer and elevating device adapted to transfer bales between a bale press and a conveyor spaced from the press with the press and conveyor providing varied elevational bale support surfaces, comprising a carriage; track means extended between said press and the conveyor supporting the carriage; first powered means connected to said carriage for selective reciprocal movement of the carriage along said track means between the press and the conveyor; an endless belt mounted on the carriage having an upper bale support run providing a bale receiving end disposed at substantially the level of said press and an opposite bale discharging end disposed at substantially the level of the conveyor, said upper run of the belt being upwardly inclined from said bale receiving end to said bale discharging end thereof; and second powered means mounted on the carriage having driving connection to the endless belt to motivate the upper run thereof in a direction from its receiving end to its discharging end so as to receive bales from the press and automatically to discharge them upon said conveyor incident to movement of the carriage toward the conveyor.

4. Apparatus including a bale transfer device for transferring bales of cotton and the like from a bale press to a conveyor, which press and conveyor have respective bale support surfaces which differ in elevation, comprising a carrier, anchor means, first powered means connected between the carrier and said anchor means operable selectively to reciprocate the carrier along a predetermined path between the press and the conveyor, a bale support mounted on the carrier having an inclined bale support surface extended from a first elevation to receive bales from the press and movable to a second elevation to deliver bales to the conveyor, and second powered means mounted on the carrier and connected to the support operable to move said support surface of the support between said first and second elevations during said reciprocation of the carrier to transfer the bales from the press to the conveyor.

5. Apparatus including a bale transfer device for transferring articles between a loading station and an unloading station which are spaced horizontally and elevationally comprising a carrier, first powered means connected to the carrier operable to reciprocate the carrier along a predetermined substantially horizontal path between said stations, an endless bale support member mounted on the carrier having an upper run inclined at an acute angle to the horizontal providing a receiving end disposed at an elevation to receive articles from the loading station and a discharge end elevationally spaced from the receiving end disposed at an elevational to discharge articles onto the unloading station, and second powered means having driving connection to the bale support member motivating the upper run thereof from the loading station toward the unloading station as the carrier is moved from the loading station toward the unloading station.

6. The apparatus of claim 5 in which the bale support member is driven continuously during reciprocation of the carrier.

References Cited
UNITED STATES PATENTS

| 1,488,858 | 4/1924 | Arndt. | |
| 1,891,687 | 12/1932 | Norman | 214—83.36 X |
| 2,498,740 | 2/1950 | Miller | 214—306 X |
| 2,577,926 | 12/1951 | Stiles | 198—126 X |
| 3,067,858 | 12/1951 | Loosli | 198—126 |

FOREIGN PATENTS 1,180,834   1/1959   France.

GERALD M. FORLENZA, *Primary Examiner.*

ALBERT J. MAKAY, *Examiner.*